United States Patent [19]
Kleyn

[11] Patent Number: 5,547,096
[45] Date of Patent: Aug. 20, 1996

[54] PLATED POLYMERIC FUEL TANK

[75] Inventor: Hendrik Kleyn, Grandville, Mich.

[73] Assignee: Kleyn Die Engravers, Inc., Jenison, Mich.

[21] Appl. No.: 361,316

[22] Filed: Dec. 21, 1994

[51] Int. Cl.$^6$ .................................................. B65D 6/24
[52] U.S. Cl. .................. 220/4.14; 220/456; 220/455; 220/562
[58] Field of Search .................................... 220/454, 455, 220/456, 562, 563, 564, 421, 422, 445, 444, 466, 4.12, 4.13, 4.14, 4.16, 501, 507, 555

[56] References Cited

U.S. PATENT DOCUMENTS

| | | |
|---|---|---|
| 1,393,719 | 10/1921 | DeSave . |
| 2,860,801 | 11/1958 | Nielsen ................................. 220/453 |
| 3,023,126 | 2/1962 | Underwood et al. . |
| 3,426,937 | 2/1969 | Boschi et al. .......................... 220/4.14 |
| 3,527,579 | 9/1970 | Cines . |
| 3,577,314 | 5/1971 | Evans . |
| 3,629,922 | 12/1971 | Miller et al. . |
| 3,694,249 | 9/1972 | Abu-Isa . |
| 3,715,231 | 2/1973 | Ng et al. ................................. 220/457 |
| 3,916,048 | 10/1975 | Walles . |
| 3,959,564 | 5/1976 | Heymann et al. . |
| 3,969,563 | 7/1976 | Hollis, Sr. ............................. 220/456 |
| 4,457,977 | 7/1984 | Walles . |
| 4,625,980 | 12/1986 | Lyzohub . |
| 4,753,368 | 6/1988 | Lescant ................................. 220/454 |
| 4,824,736 | 4/1989 | Ehrig et al. ........................... 220/461 |
| 4,940,609 | 7/1990 | Tschang et al. . |
| 5,129,544 | 7/1992 | Jacobson et al. . |

*Primary Examiner*—Stephen J. Castellano
*Attorney, Agent, or Firm*—Warner Norcross & Judd

[57] ABSTRACT

An electroplated, polymeric fuel tank fabricated of inner and outer shells. The outer shell is an assembly of outer shell halves joined together along peripheral flanges. A layer of copper, a layer of nickel, and a layer of chrome are successively electroplated to either or both of the interior and exterior surfaces of the outer shell halves to prevent permeation of fuel through the shell.

8 Claims, 5 Drawing Sheets

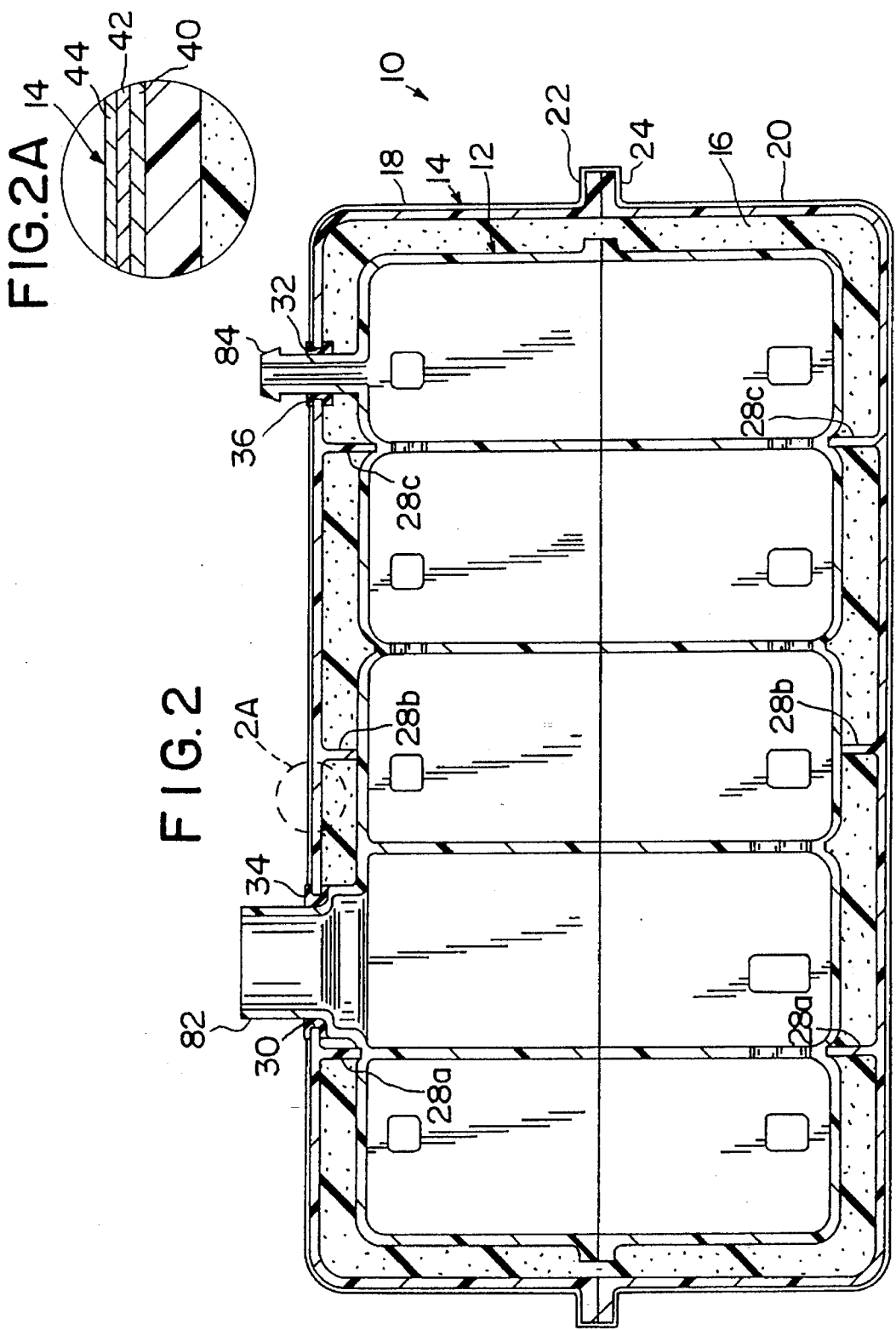

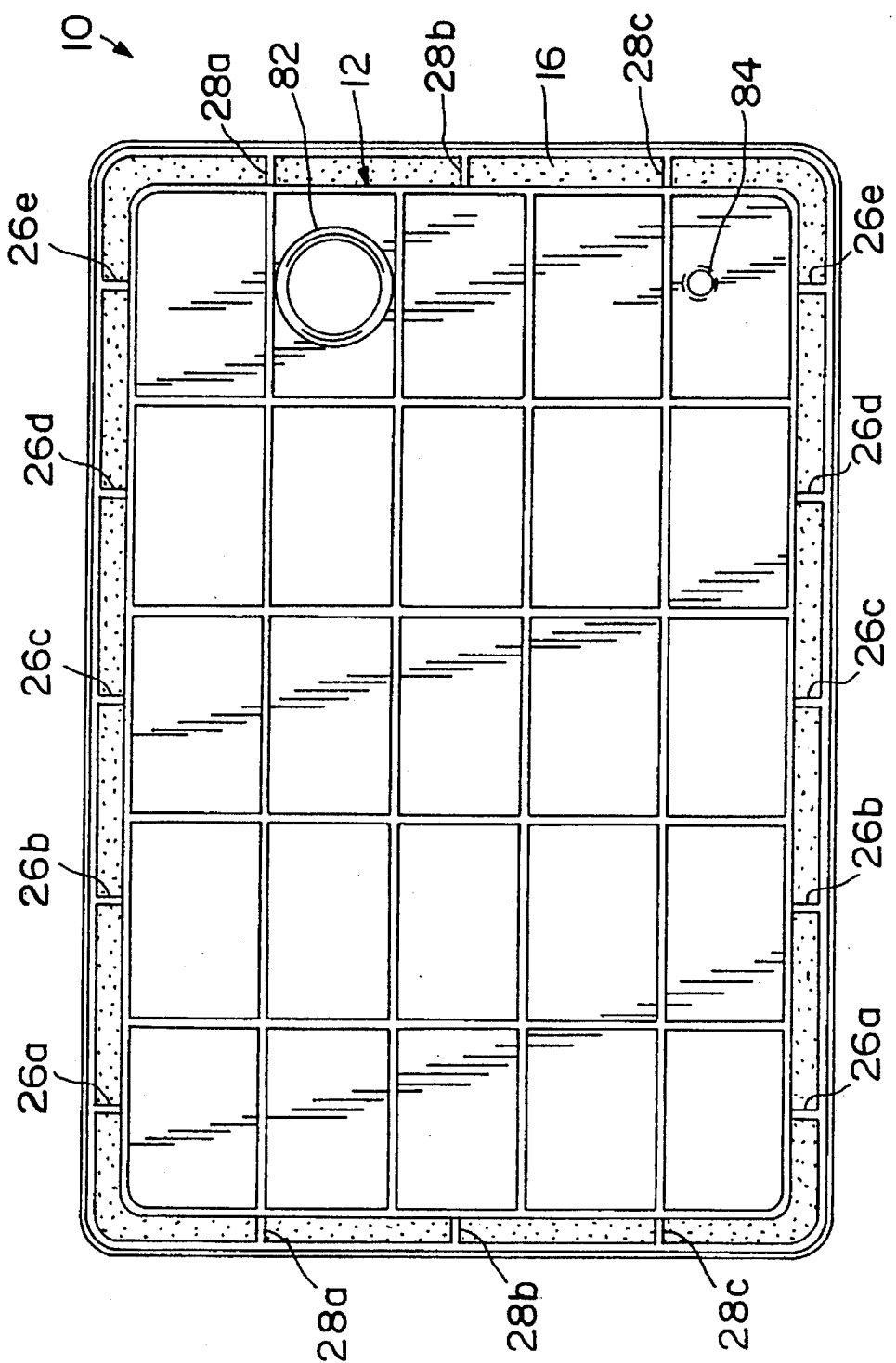

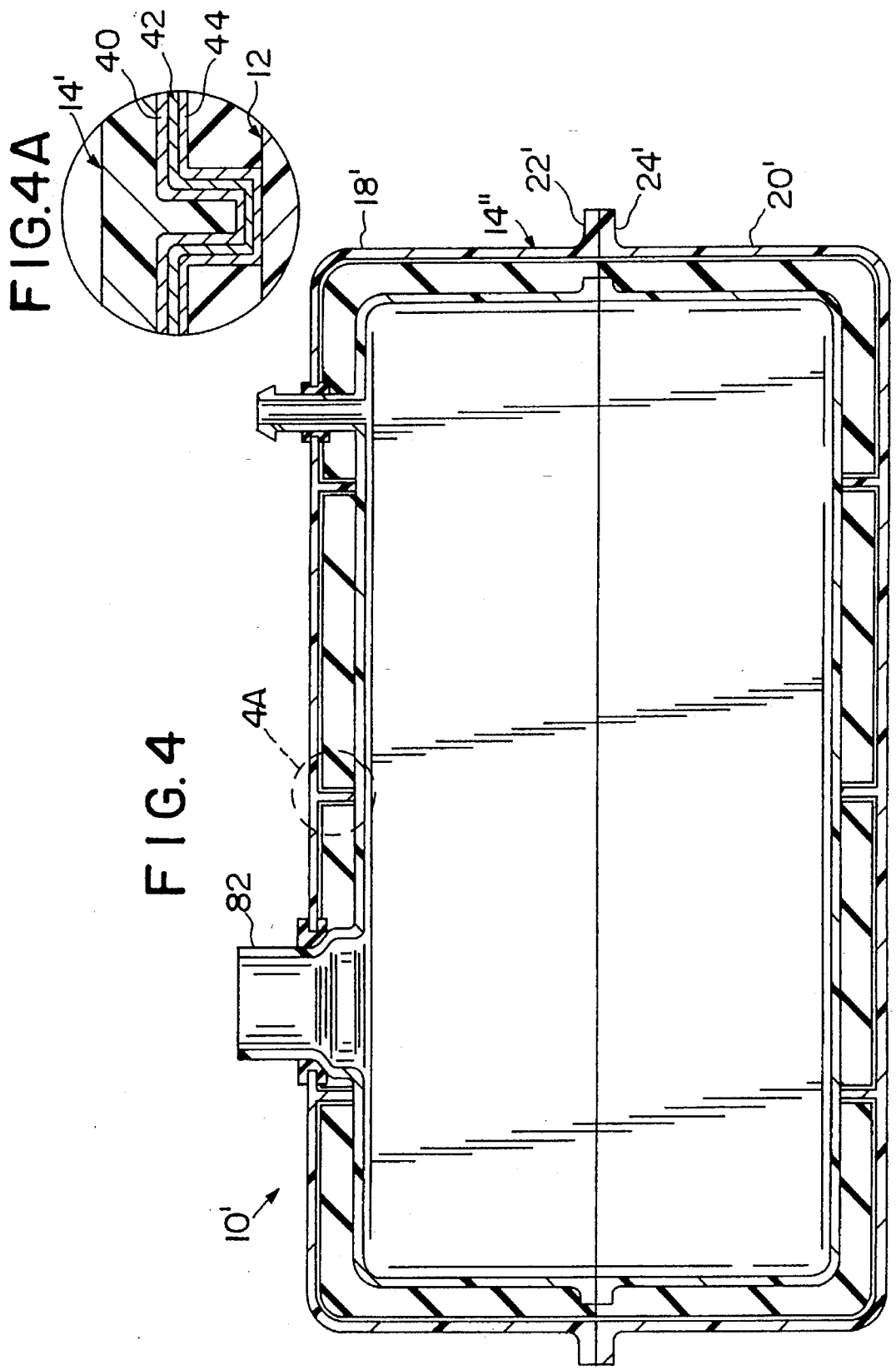

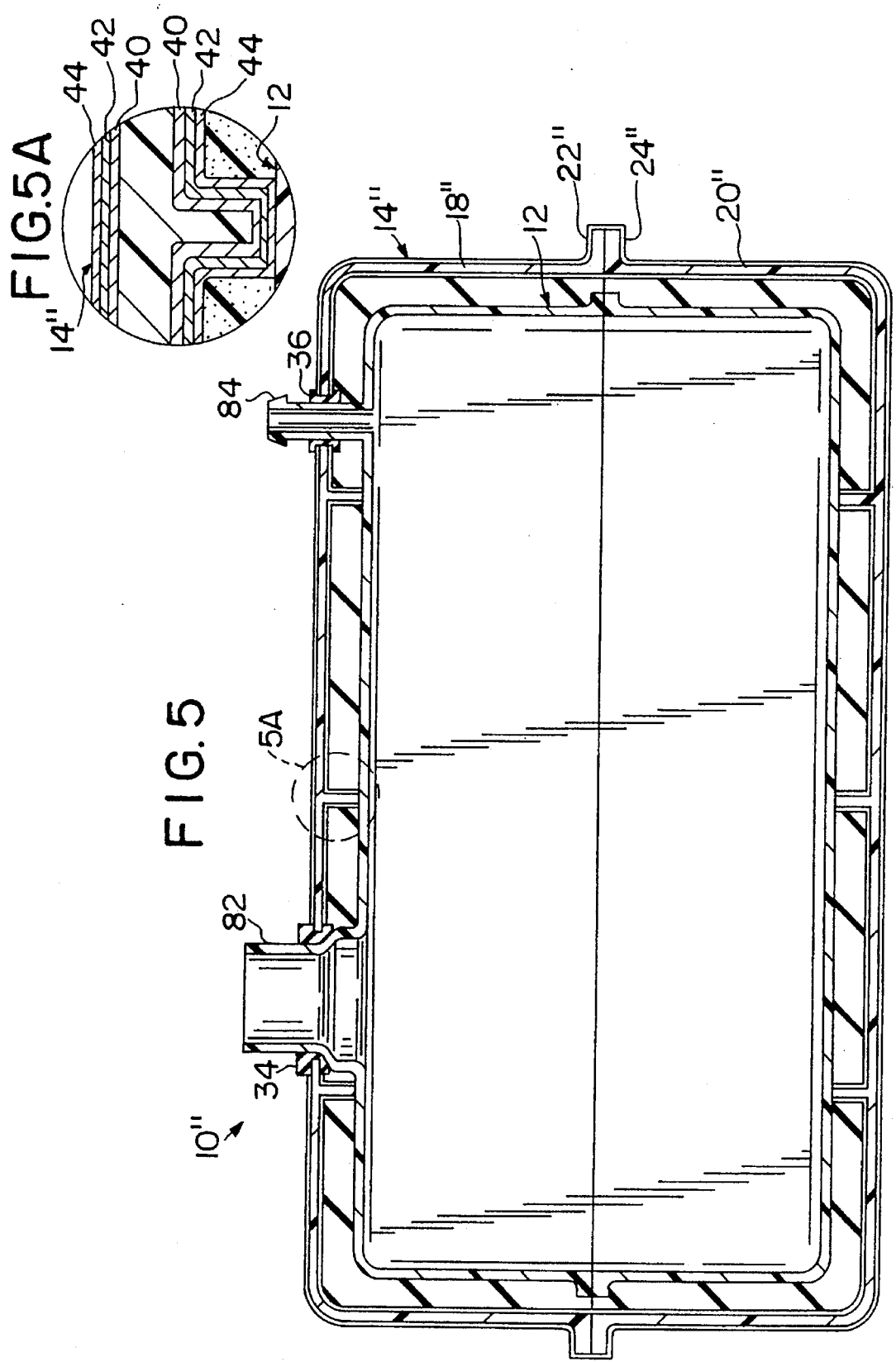

PLATED POLYMERIC FUEL TANK

BACKGROUND OF THE INVENTION

The present invention relates to fuel tanks, and more particularly, to polymeric fuel tanks.

Most fuel tanks are manufactured from stamped metal shell halves. Conventional metal fuel tanks are not only expensive, but they are also relatively heavy and subject to corrosion. In an attempt to avoid the cost, weight, and corrosion problems associated with conventional metal fuel tanks, there is an increasing trend to look toward polymeric fuel tanks.

Polymeric fuel tanks provide a low-weight, corrosion resistant alternative to conventional metal fuel tanks. A particularly ingenious polymeric fuel tank is disclosed in U.S. patent application Ser. No. 07/957,248 filed Dec. 6, 1992 to Hendrik Kleyn. This tank includes a polymeric outer shell surrounding a polymeric inner shell having internal walls that divide the interior of the tank into a series of cells. A fuel absorbent material is located in the space between the inner and outer shells to absorb fuel that might escape from the inner shell.

However, fuel tanks manufactured solely from polymeric materials are subject to permeation and evaporation. To overcome these problems, various composite polymeric constructions have been developed. Composite polymeric constructions have the potential to provide a light-weight, corrosion-resistant alternative to conventional metal fuel tanks.

One such composite fuel tank is disclosed in U.S. Pat. No. 5,129,544 issued Jul. 14, 1992 to Jacobson et al. The Jacobson tank is a laminated construction having an outer layer of abrasion resistant material, such a plastic, Mylar, Teflon, or nylon; a reflective layer of metallic foil; a vapor barrier layer, such as Teflon; a structural layer; and a chemical resistant layer such as Teflon or nylon. The various layers of the tank are bonded together using heat, pressure, and adhesives. The complex laminated structure of this tank is relatively expensive to construct.

A second composite fuel tank is shown in U.S. Pat. No. 4,625,980 issued Dec. 2, 1986 to Lyzohub. The Lyzohub tank has a flexible elastomeric liner fitted within a two-piece metal shell. The elastomeric liner includes a lip trapped between the two pieces of the metal shell. The metal shell of the Lyzohub tank is subject to corrosion and increases both the weight and cost of the tank.

SUMMARY OF THE INVENTION

The aforementioned problems are overcome by the present invention wherein a polymeric fuel tank is electroplated to prevent permeation of fuel through the tank.

In the preferred embodiment, the outer shell of a two-shell construction is plated. The outer fuel tank shell is preferably formed of two outer shell halves that are joined together along peripheral flanges to protectively encapsulate an inner fuel tank shell. In the preferred embodiment, the outer shell is electroplated on the outer surface. The metallic plating eliminates permeation and evaporation of fuel from the tank. In a preferred embodiment, the outer shell is fabricated from an electroplatable polymer.

The present invention provides a low-cost, light-weight, polymeric fuel tank that eliminates permeation and evaporation of fuel and that is non-corrosive.

These and other objects, advantages, and features of the invention will be more readily understood and appreciated by reference to the detailed description of the preferred embodiment and the drawings.

BRIEF DESCRIPTION OF THE DRAWINGS

FIG. 2 is a elevational, sectional view of the fuel tank taken along line II—III in FIG. 1;

FIG. 2A is an enlarged sectional view of the area within circle 2A in FIG. 2;

FIG. 3 is a plan, sectional view of the fuel tank taken along line III—III in FIG. 1;

FIG. 4 is an elevational, sectional view of a first alternative embodiment of the outer shell;

FIG. 4A is an enlarged sectional view of the area within circle 4A in FIG. 4;

FIG. 5 is an elevational, sectional view of a second alternative embodiment of the outer shell; and FIG. 5A is an enlarged sectional view of the area within circle 5A in FIG. 5.

DETAILED DESCRIPTION OF THE PREFERRED EMBODIMENT

Figure 1:
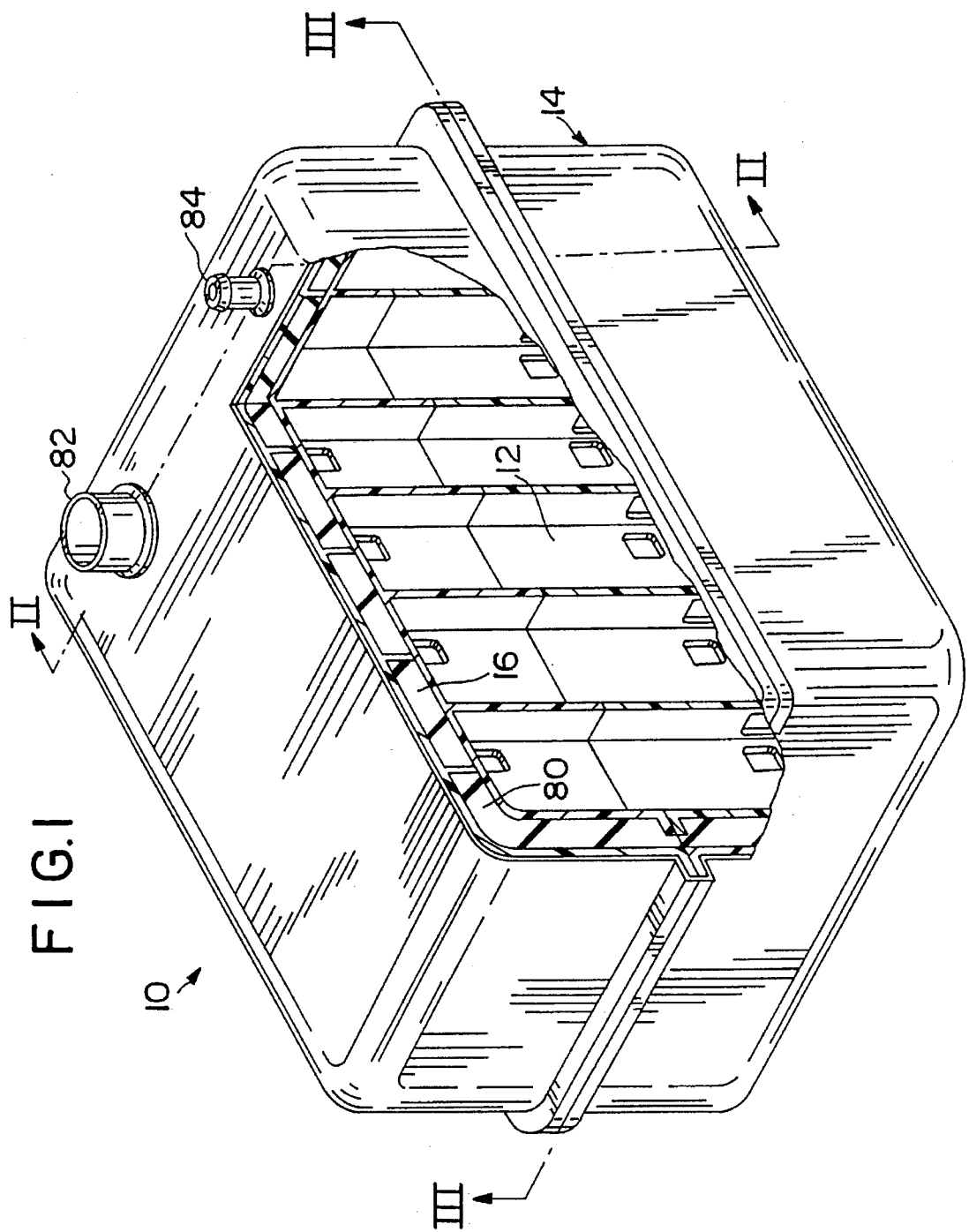
FIG. 1 is a perspective view of the fuel tank, with a portion of the tank broken away.

A plated polymeric fuel tank shell constructed in accordance with a preferred embodiment of the invention is illustrated in FIG. 1, and generally designated 10. For purposes of disclosure, the present invention will be described in connection with a preferred embodiment of the polymeric fuel tank disclosed in U.S. patent application Ser. No. 07/957,248 filed Dec. 6, 1992 to Kleyn entitled COMPARTMENTED FUEL TANK WITH FUEL ABSORBENT MATERIAL which is incorporated herein by reference. However, the present invention is readily adaptable for use with other polymeric or permeable fuel tanks, including those that are blow-molded.

In general, the assembled fuel tank 10 includes an inner polymeric shell 12 surrounded by an electroplated polymeric outer shell 14. The outer shell 14 is larger than the inner shell and extends outwardly beyond the inner shell in all directions to define a space 80 therebetween. The inner shell includes a filler neck 82 and an outlet neck 84 which allow fuel to enter and exit the tank 10. The configuration of the filler neck 82 and outlet neck 84 will vary from application to application. The space 80 between the two shells is filled with a fuel absorbent material 16 to absorb or take-up fuel that might escape from the inner shell. The inner shell 12, the unplated outer shell 14, and the fuel absorbent 16 are not subjects of the present invention and accordingly will not be described in detail herein.

Referring to FIG. 2, outer shell 14 is an assembly of an upper outer shell half 18 mated to a lower outer shell half 20. Each outer shell half is formed with a peripheral flange 22, 24. The two shell halves are preferably joined by heat welding to form a leak-tight seal. Alternatively, a resilient gasket (not shown) is placed between the flanges 22, 24, and conventional fasteners are used to adjoin the outer shell halves. When sufficiently compressed, the gasket provides a leak-tight seal. In either case, the outer shell 14 envelops the inner shell 12 providing sufficient space therebetween for an adequate volume of fuel absorbent material 16.

The outer shell 14 is preferably formed with two apertures 30, 32 which correspond in both location and diameter to the filler neck 82 and the outlet neck 84 of the inner shell 12, respectively. The filler neck 82 and outlet neck 84 each extend outwardly from the inner shell 12 through apertures 30 and 32, respectively. An enclosure gasket 34, 36 is seated around the periphery of each of the apertures 30 and 32, respectively. The enclosure gaskets 34, 36 are sufficiently compressed between the outer shell 14 and the necks 82, 84 to provide a leak-tight seal. Additional apertures or openings may be formed through the outer shell halves as necessary to meet the specifications of the inner shell.

The outer shell halves 18, 20 are integrally formed with spaced-apart, internal spacer walls 26a–e, 28a–c which engage the exterior of the inner shell 12 (see FIGS. 2 and 3). The spacer walls increase the rigidity of the outer shell and position the inner and outer shells with respect to one another. Preferably, spacer walls 26a–e extend laterally across the interior of each outer shell half intersecting with longitudinally extending spacer walls 28a–c. The number, dimensions, and location of the spacer walls are selected in view of desired strength and spacing.

The outer shell 14 is preferably injection molded from an electroplatable polymer, such as a nylon resin. Alternatively, the outer shell 14 can be manufactured from any polymeric material that may be etched or otherwise treated to receive electroplating. For example, the outer shell can be manufactured from conventional polypropylene and then etched using conventional methods prior to electroplating. The etching process increases the porosity of the polymer to facilitate the adhesion of metal during electroplating.

The exterior of each outer shell half 18, 20 is electroplated using conventional techniques for plating metals on polymers. While such techniques are generally known, they have not previously been used in the fuel tank art. Applicant has conceived that such plating is an economic and effective means for preventing permeation of fuel through the tank walls. For example, as illustrated in FIG. 2A, the outer shell halves are successively electroplated with a layer of copper 40, a layer of nickel 42, and a layer of chrome 44. In the preferred embodiment, each layer of metal has a thickness of less than 0.0005 inches. However, various thicknesses will suffice.

In a first alternative embodiment, each outer shell half is electroplated on the interior surface rather than the exterior surface (See FIGS. 4 and 4A). This alternative protects the metal layers from scratches or gouges that may be created in the exterior of the tank caused by handling, the mounting hardware, or stones and other road debris. When the shell halves 18', 20' are to be interconnected by heat welding, it is preferable not to plate the interior surfaces of flanges 22' and 24', or to remove the metal from the flanges after electroplating, because the metal may adversely affect the weld. When the shell halves 18, 20 are to be interconnected by a gasket and fasteners, the interior surface of the flanges 22', 24' may be electroplated.

In a second alternative embodiment, illustrated in FIGS. 5 and 5A, the two outer shell halves 18", 20" are electroplated on both the interior and exterior surfaces. Again, it is preferable not to plate the interior surfaces of the flanges 22", 24" if the shell halves 18, 20 are interconnected by heat welding. Obviously, this embodiment provides the best protection against permeation.

In yet another alternative embodiment, the inner shell 12 can be electroplated in addition to or in place of the outer shell 14. As with the outer shell, the inner shell may be plated on either or both the inside and outside surface. In applications where the outer shell is not necessary, it can be eliminated and the fuel tank can simply include an electroplated inner shell.

The above descriptions are those of preferred embodiments of the invention. Various alterations and changes can be made without departing from the spirit and broader aspects of the invention as defined in the appended claims, which are to be interpreted in accordance with the principles of patent law including the doctrine of equivalents.

The embodiments of the invention in which an exclusive property or privilege is claimed are defined as follows:

1. A plated, polymeric fuel tank shell, comprising:

a first outer shell half;

a second outer shell half mating with said first outer shell half to define a spaces for the containment of an inner shell; and a metallic plating on a surface of said first and said second shell halves, said metallic plating includes a layer of copper, a layer of nickel, and a layer of chrome.

2. The fuel shell tank of claim 1, wherein said first and said second outer shell halves each include interior and exterior surfaces; and wherein said metallic plating is electroplated to said exterior of said first and said second outer shell halves.

3. The fuel tank shell of claim 2, wherein said first and said second outer shell halves each include interior and exterior surfaces; and wherein said first layer is electroplated to said interior surface of said first and said second outer shell halves.

4. A fuel tank, comprising:

an inner shell enclosing a space for the containment of a fuel;

an outer shell enveloping said inner shell and defining a space between said inner shell and said outer shell;

a fuel absorbent material disposed in said space between said inner shell and said outer shell; and a metallic plating on a surface of said outer shell, said metallic plating includes layers of copper, nickel, and chrome.

5. The fuel tank of claim 4, wherein said outer shell includes interior and exterior surfaces; and wherein said metallic plating is electroplated to said exterior surface of said outer shell.

6. The fuel tank of claim 4, wherein said outer shell includes interior and exterior surfaces; and wherein said metallic plating is electroplated to said interior surface of said outer shell.

7. In a fuel tank including an inner shell for the containment of a fuel, an outer shell enveloping said inner shell and defining a space between said inner shell and said outer shell, and a fuel absorbent material disposed in the space between the inner and outer shells, wherein the improvement comprises said outer shell, said outer shell comprising:

a first polymeric outer shell half;

a second polymeric outer shell half mating with said first outer shell half; and a metallic plating electroplated to a surface of said first and said second shell halves, whereby said metallic layer prevents permeation of said fuel through said outer shell, said metallic plating includes layers of copper, nickel, and chrome.

8. The fuel tank of claim 7, wherein said first and said second outer shell halves are injection molded from an electroplatable polymer.

\* \* \* \* \*